G. H. BARTLETT.
ORNAMENTED MOLDED CONCRETE ARTICLE.
APPLICATION FILED JAN. 2, 1906.
932,092.
Patented Aug. 24, 1909.
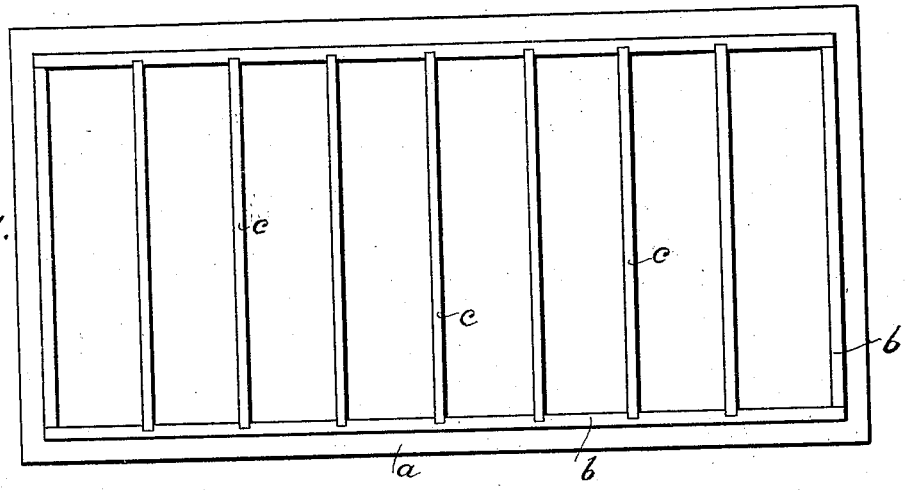
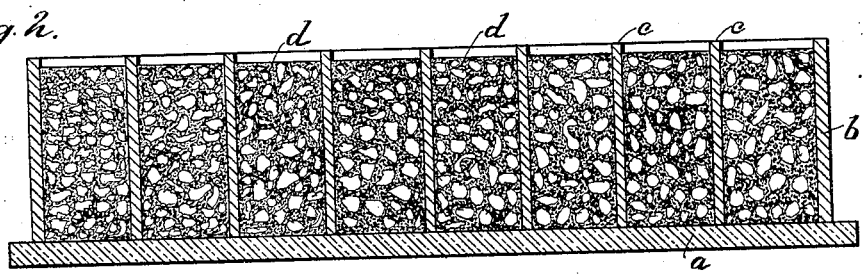
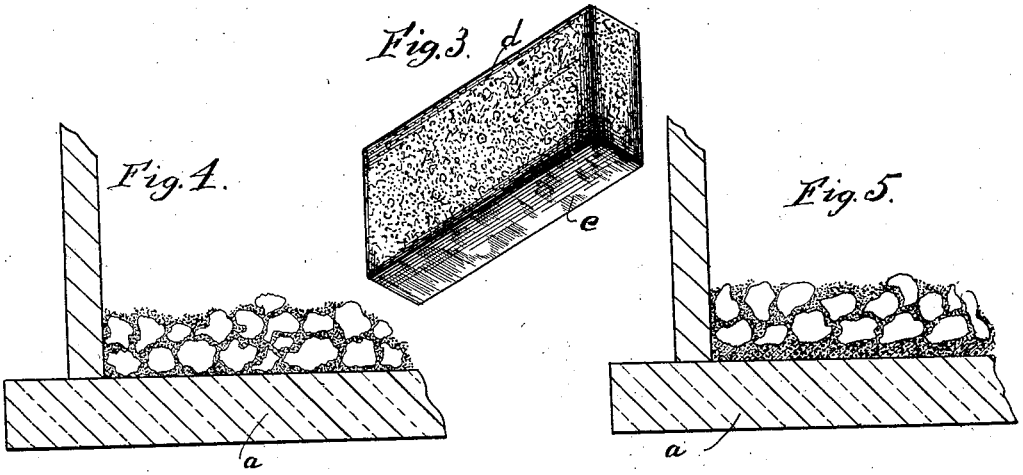
Witnesses
J. C. Harrison
H. Juscaud Jr.
Inventor
Geo. H. Bartlett
By Wright, Brown, Quinby & May
Attorneys

UNITED STATES PATENT OFFICE.

GEORGE H. BARTLETT, OF BOSTON, MASSACHUSETTS, ASSIGNOR TO THE ENAMEL CONCRETE COMPANY, OF DES MOINES, IOWA.

ORNAMENTED MOLDED CONCRETE ARTICLE.

932,092.  Specification of Letters Patent.  Patented Aug. 24, 1909.

Application filed January 2, 1906. Serial No. 294,302.

*To all whom it may concern:*

Be it known that I, GEORGE H. BARTLETT, of Boston, in the county of Suffolk and State of Massachusetts, have invented certain new and useful Improvements in Ornamented Molded Concrete Articles, of which the following is a specification.

This invention has for its object the production of a relatively inexpensive ornamental molded non-combustible body adapted for use as a brick or other structural unit, or for other purposes, the said body having a molded face which is characterized by smoothness and by a brilliant gloss or luster, the said face resembling in these characteristics that of ordinary transparent smooth surfaced glass or highly polished natural stone.

The invention is based on the fact that ordinary concrete comprising broken stone or gravel, sand and hydraulic cement, when formed into a body in a mold having a smooth and glossy forming surface, will acquire from the said surface a face conforming with such exactness to the forming surface of the mold, that the formed face of the concrete body will have exactly the same characteristics of smoothness and luster that are possessed by the forming surface of the mold. This result I believe to be due to the fact that the sand and stone ingredients, of the concrete which constitute the major portion of the mass, are inert or devoid of hydraulic crystallizing energy, the energy being confined to the limited quantity of cement in the voids and on the outer surface of the mass of sand and stone, so that the setting or crystallization of that portion of the cement which is in contact with the forming surface of the mold forms a face which conforms more exactly to the said forming surface than would be the case if the entire mass were composed of hydraulic cement, the said face having the same smoothness and gloss or luster that are possessed by the forming face. I am confirmed in this belief by the fact that a mass of hydraulic cement unmixed with inert materials such as sand and broken stone, when formed in the same mold, will not acquire therefrom a face of the same smoothness and gloss or luster as the forming surface of the mold, the face of the molded all-cement body having numerous very minute depressions which, while invisible to the naked eye as depressions, give the said face a relatively dead lack-luster appearance.

My experiments have demonstrated that the following differences exist between a concrete brick and an all-cement brick, both formed in the same mold, the latter having a smooth and lustrous or glossy forming surface. First, the face of the concrete brick presents to the eye a luster or gloss exactly the same as that of the forming face, while the face of the all-cement brick presents a relatively dead or lack-luster appearance. Secondly, the face of the concrete brick presents to the touch a smoother feeling than that presented by the face of the all-cement brick. Thirdly, the face of the concrete brick does not give off any of its material when rubbed briskly by a cloth contrasting with it in color, while such cloth rubbed briskly on the face of the all-cement brick receives some of the material in the form of an impalpable powder which is clearly visible on the cloth.

My invention therefore consists in an improved ornamented article of manufacture, to wit, a brick or other body composed of concrete, (which includes suitable inert ingredients and hydraulic cement,) and having a smooth and glossy or lustrous ornamental face formed by the setting or crystallization of a surface portion of the cement in contact with a smooth and glossy or lustrous mold-surface, the face thus formed being characterized by absolute conformity or fidelity to the forming surface in the matter of smoothness and gloss or luster, in consequence of the presence of the inert ingredients forming the major part of the bulk of the concrete mixture.

Of the accompanying drawing,—Figure 1 represents a plan view of one form of mold which may be employed in producing an ornamented concrete brick according to my invention. Fig. 2 represents a longitudinal section of the mold shown in Fig. 1, the compartments of the mold being filled with the concrete. Fig. 3 is a perspective representation of an ornamented concrete brick produced according to this invention. Figs. 4 and 5 are enlargements of portions of Fig. 3.

The same reference characters indicate the same parts in all the figures.

In making concrete bricks the mold which may be employed may comprise a base $a$, which may be made of any material having a smooth and glossy upper forming surface, to which Portland or other hydraulic cement will not adhere during the setting and hardening. An outer rectangular frame b, having partitions c, is placed upon the base a, and the spaces between said partitions c are filled with a concrete cement mixture, according to the ordinary "wet process."

The concrete is represented at d, and includes suitable inert materials such as broken stone and sand, and hydraulic cement reduced by water to a paste. Suitable proportions are broken stone 6 parts, sand 3 parts, and cement 1 part. These proportions may be varied however. The material is inserted in the mold until it fills or nearly fills the spaces or chambers between the partitions c and the side walls b, and is allowed to set and harden, care being taken to insure contact of the plastic cement with all parts of the forming surface of each mold. The material of which the sides b and the partitions c are made forms no part of this invention. It may be wood, stiff waterproof paper, leatherboard, tin, or any other kind of metal. It is preferable that the sides of the brick which engage the mortar in a wall shall be rough, so as to better interlock with the mortar, but in accordance with my invention the face which is exposed at the front of the wall is very smooth and glossy, or lustrous, so as to present a surface resembling in gloss or finish that of highly polished granite or marble, and owing to the fineness of the grain of the surface, to more successfully resist absorption of moisture. The practice of this invention has demonstrated that the base a may be made of celluloid or of hard rubber, or of japanned wood or sheet metal having a forming surface which is smooth and glossy or lustrous. By placing a flat sheet of either of said materials, or of any other suitable material, on a smooth table or bed with its glossy forming face upward, a bottom may be formed for a mold partitioned to form as many bricks as is found practicable. The strips of wood, tin, fiber-board, or other material forming the sides and partitions of the mold are so placed relatively to each other, and are of such sizes, that the bricks formed in the spaces of the mold will be formed with a narrow edge downward. In other words, a brick of the usual dimensions of two by four by eight inches will be formed in a mold which is two inches wide, four inches deep, and eight inches long. The casting or molding of the bricks in this manner provides a smoother and more glossy face for the surface that is to be exposed in the wall of a building than if the brick should be formed in a mold of a two-inch depth and four-inch width. The reason for this is that the weight of all of the material forming each brick is borne by a relatively small area, and therefore the pressure upon the cement in contact with the glossy forming surface of each mold will be greater when the brick is molded edgewise than if it were molded flatwise.

When it is desired to cast or mold bricks which are to be used at the corner of a wall, it is desirable that one end of the brick shall have a polished surface, to correspond with the polished surface indicated at e in Fig. 3 of the drawings. For this purpose, a thin strip of polished celluloid or other material may be placed against one end wall of each brick mold, prior to pouring in the concrete.

The cement may be colored if desired, so that the glossy surface may present any shade that is wanted. I have found that in using colored cement a desirable mottled effect may be produced, the glossy cement face having a given shade where parts of the inert material lie close to the said face, and a different shade where the face is backed by cement contained in voids in the mass of inert material.

To insure uninterrupted contact of the cement with all parts of the forming surface it may be desirable in some cases to apply a thin coating of cement to the forming surface before inserting the concrete mixture in the molds, this coating subsequently uniting with the cement ingredient of the mixture.

While I have thus particularly described my invention as embodied in a concrete brick, and the method of making the same, I do not confine myself to a brick shaped article, it being obvious that a concrete body ornamented as described of any shape capable of being formed in a mold, may be produced without departing from the spirit of my invention. A spherical body of concrete may be formed in a hollow spherical mold internally smooth and glossy, and said mold may be a hollow glass globe requiring breakage to uncover the molded body, or it may be of sectional construction so that it may be opened or dissected to uncover the molded body. I have conclusively demonstrated that the face formed by the crystallization or setting of a surface portion of the limited quantity of hydraulic cement contained in a body of ordinary concrete mixture, by contact with a glossy forming surface, is a more perfect replica of the said forming surface than the face of an all-cement body formed in the same way.

The relative imperfectness of the face of the all-cement body may be due, in part at least, to the recession of water from the cement in contact with the forming surface of the mold prior to and during the process of crystallization, the recession being due to absorption by the relatively large mass of cement of enough water from the surface to cause the numerous minute depressions hereinbefore referred to in the formed face. In a concrete body there is no thick mass of cement capable of absorbing water from the surface portion, the stone and sand which form the major part of the mass being non-absorbent.

While I have mentioned the possibility of first applying a coating of cement to the glossy forming surface of the mold before inserting the concrete mixture, I desire it understood that such procedure is desirable chiefly when the surface cement is given a distinctive color. When a distinctive surface color is not desired, contact of the cement with all parts of the forming surface of the mold may be secured by the natural flowage of the cement, the latter being of about the consistency of cream so that it will flow through the voids of the mass of inert matter, and spread over the forming face.

I claim:

1. An artificial crystallized stone comprising a solid and impenetrable molded body having a polished face as an integral part of the body, said polished face being accomplished and completed by holding concrete material containing an excess of water in contact with a polished and non-adhesive panel beneath said material, and allowing the same to remain in such contact until dry and thoroughly hardened and provided with a permanent polish.

2. An artificial crystallized stone comprising a solid and impenetrable molded body having a polished face as an integral part of the body, said polished face being accomplished and completed by holding a requisite quantity of concrete material containing an excess of water during the setting and hardening and drying of the material, with a lower face portion thereof in contact with a polished, moisture-repellent, and non-adhesive surface or panel.

3. As an article of manufacture, an artificial stone product obtained under the wet process by depositing upon a smooth forming surface or surfaces a mass of concrete, which includes cement and contains an excess of water to cause the cement to cover the forming surface or surfaces, and confining the mass until the cement crystallizes and hardens.

4. As an article of manufacture, a concrete product, having a polished surface, obtained by depositing concrete material, including cement mixed with water in a mold having glossy panels, and allowing the same to remain in contact with said panels during the settling and draining of the water in the material, thereby causing the last hardening to take place in the portion or portions of the article in contact with said panel, the said product remaining in contact with the panel or panels until hardened and provided with a permanent polish.

In testimony whereof I have affixed my signature, in presence of two witnesses.

GEORGE H. BARTLETT.

Witnesses:
 CHAS. H. WOODMAN,
 C. F. BROWN.